United States Patent
Browning et al.

(10) Patent No.: US 6,842,809 B2
(45) Date of Patent: Jan. 11, 2005

(54) APPARATUS, METHOD AND COMPUTER PROGRAM PRODUCT FOR CONVERTING SIMPLE LOCKS IN A MULTIPROCESSOR SYSTEM

(75) Inventors: Luke Matthew Browning, Austin, TX (US); Thomas Stanley Mathews, Austin, TX (US); Paul Edward McKenney, Beaverton, OR (US); James Bernard Moody, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 09/833,417

(22) Filed: Apr. 12, 2001

(65) Prior Publication Data

US 2002/0199045 A1 Dec. 26, 2002

(51) Int. Cl.[7] ............................................... G06F 12/00
(52) U.S. Cl. .................................... 710/200; 710/240
(58) Field of Search ............................. 710/200, 220, 710/240, 241, 242; 718/104; 711/147, 152

(56) References Cited

U.S. PATENT DOCUMENTS

| | | | | |
|---|---|---|---|---|
| 5,678,026 A | * | 10/1997 | Vartti et al. | 711/152 |
| 5,790,851 A | * | 8/1998 | Frank et al. | 718/104 |
| 6,105,085 A | * | 8/2000 | Farley | 710/41 |
| 6,473,819 B1 | | 10/2002 | Jackson et al. | 710/200 |
| 6,480,918 B1 | * | 11/2002 | McKenney et al. | 710/200 |
| 2002/0087769 A1 | * | 7/2002 | McKenney et al. | 710/200 |

* cited by examiner

*Primary Examiner*—Khanh Dang
*Assistant Examiner*—Clifford Knoll
(74) *Attorney, Agent, or Firm*—Duke W. Yee; Volel Emile; Stephen J. Walder, Jr.

(57) ABSTRACT

An apparatus, method and computer program product for minimizing the negative effects that occur when simple locks are highly contended among processors which may or may not have identical latencies to the memory that represents a given lock, are provided. The apparatus, method and computer program product minimize these effects by converting simple locks such that they act as standard simple locks when there is no contention and act as krlocks when there is contention for a lock. In this way, the number of processors spinning on a lock is limited to a single processor, thereby reducing the number of processors that are in a wait state and not performing any useful work.

48 Claims, 3 Drawing Sheets

APPARATUS, METHOD AND COMPUTER PROGRAM PRODUCT FOR CONVERTING SIMPLE LOCKS IN A MULTIPROCESSOR SYSTEM

BACKGROUND OF THE INVENTION

1. Technical Field

The present invention is directed to an apparatus, method and computer program product for converting simple locks (e.g., disabled mutex spin locks) in a multiprocessor system. More specifically, the present invention is directed to an apparatus, method and computer program product for minimizing the negative effects that occur when such locks are highly contended among processors which may or may not have identical latencies to the memory that represents a given lock.

2. Description of Related Art

Multiprocessing systems provide the benefits of being able to process multiple instructions simultaneously. Such systems have increased the number of instructions per cycle that computer systems are able to execute and have added to the speed at which computerized functions are performed.

One type of multiprocessing system is the Symmetric Multiprocessing (SMP) system. The SMP architecture is an architecture in which multiple processors share the same memory. SMP systems provide scalability, e.g., as business increases, additional processors can be added to absorb the increased transaction volume. SMP systems range from two to as many as 32 or more processors.

SMP systems, however, are fallible in that if one processor fails, the entire SMP system, or node, goes down. In order to avoid such failings, clusters of two or more SMP systems can be used to provide high availability, or fault resilience, in case of failure. That is, if one SMP system fails, the others continue to operate.

In SMP systems, a single processor generally boots the system and loads the SMP operating system, which brings the other processors online. There is only one instance of the operating system and one instance of the application in memory. The operating system uses the processors as a pool of processing resources, all executing simultaneously, either processing data or in an idle loop waiting to do some useful processing work.

SMP speeds up whatever processes can be overlapped. For example, in a desktop computer, SMP speeds up the running of multiple applications simultaneously. If an application is multithreaded, i.e. the application is broken up into multiple processes which allow for concurrent operations within the application itself, then SMP improves the performance of that single application.

Another type of multiprocessing system is a Non-Uniform Memory Access (NUMA) system or cache coherent Non-Uniform Memory Access (ccNUMA) system. NUMA is a multiprocessing architecture in which memory is separated into close and distant banks. NUMA is similar to SMP, in which multiple processors share a single memory at the same speed, with the exception that in NUMA, memory on the same processor board as the processor (local memory) is accessed faster than memory on other processor boards (shared memory). As a result, NUMA architecture scales much better to higher numbers of processors than SMP.

With such multiprocessor systems, processors must contend for access to the shared memory resources. When a processor owns a lock used to serialize access to a shared memory resource, that processor gains control over that shared memory resource. The "lock" gives the processor exclusive access to the resource until the lock is released.

In the Advanced Interactive executive (AIX) environment, the mechanism for obtaining a lock on a system resource is referred to as the simple lock. A simple lock is a mutex mechanism in which the lock acquirer successfully changes the contents of a mutex to acquire ownership of the lock. Mutex (MUTually EXclusive) is a programming flag used to grab and release an object. When data is acquired that cannot be shared or processing is started that cannot be performed simultaneously elsewhere in the system, the mutex is set to "lock," which blocks other attempts to use it. The mutex is set to "unlock" when the data is no longer needed or the routine is finished.

AIX conventionally uses the thread id of the acquiring thread or interrupt handler, along with other bit mapped information that will fit in the mutex, such that the ownership of the lock can be observed and debugged. AIX uses the thread id so that ownership can be observed, but the owner knows it owns the lock because the owner succeeded in changing the value of the mutex, irrespective of the contents. A thread or interrupt handler acquires a simple lock by calling a function which manages the atomic update of the mutex and the entire contents of the lock word, i.e. the mutex.

In the multiprocessor environment, a plurality of processors may attempt to access the same shared memory resource by attempting to acquire a mutex lock. Only one is provided exclusive access to the shared memory resource at a time. If the resource is "in use" or locked by another processor, any other requesting processor "spins" on the lock for that resource when it attempts to acquire the lock. While a processor is spinning on a lock for a resource, it is not performing any other work.

As the number of processors in a system increases, the potential for contention for a lock that protects a shared memory resource increases dramatically. In NUMA systems, processors that access a memory location (or mutex) will have different latencies, with the effect being that acquisition of the lock by a processor with a longer latency will be more difficult than by a processor with a shorter latency. This makes normal mutex lock acquisition unfair. A given processor that has a longer latency to a mutex than other processors has a disadvantage with respect to all those other processors. When latencies can be different, a given processor or a number of processors may become unable to acquire a lock due to starvation from processors with shorter latencies.

Thus, it would be beneficial to have an apparatus, method and computer program product for handling simple locks in a multiprocessor system that is fair to all of the processors of the multiprocessor system.

SUMMARY OF THE INVENTION

The present invention provides an apparatus, method and computer program product for minimizing the negative effects that occur when simple locks are highly contended among processors which may or may not have identical latencies to the memory that represents a given lock. The present invention minimizes these effects through an improved apparatus, method and computer program product for converting simple locks.

In the present invention, to achieve fairness for each of the processors in the multiprocessor system, more structure is added to the locking mechanism. Within the mutex lock mechanism simple_lock( ) framework, krlocks are used to control simple lock acquisition. Where other mutex lock mechanisms like simple_lock( ) 'spin' on the lock word to acquire the mutex, the present invention requires the acquisition of a krlock (which is exclusive and fair) before 'spinning' on the simple lock mutex.

A krlock is acquired by one processor handing off ownership to the next processor requesting the krlock. The krlock framework defines data structures and algorithms that provide a different memory location for each processor to spin on that is requesting a given krlock. To acquire a krlock, a requesting processor spins on a memory location reserved for that processor until it is handed the krlock by the owner. If there is only one processor requesting the krlock, it is self-granted.

When a thread releases a krlock, the unlocking code changes the value of the spin location of the requesting processor to which the krlock is being granted. That processor holds the krlock until it grants the krlock to the next processor. If no processor holds the krlock, it is granted immediately. If no processor is requesting the krlock at krlock release time, it is not held by any processor and is available to be granted immediately. Since the krlock is pushed to the next processor instead of pulled to the processor with the smallest latency, the mechanism avoids starvation and is thus more fair.

Within the krlock framework, processors with identical latencies are grouped together and a krlock is granted within that group as a matter of bias. After handing off to the same group for some set number of hand-offs (or until no other processor within the group is requesting the krlock), the krlock is passed to a different set of processors that have equal latencies with respect to one another, but potentially different latencies with respect to the previous group. Since krlocks occur under the framework of the simple lock mechanism, the effect is that simple locks, when contended, behave the same way that krlocks behave, without requiring any changes in the binary interface to simple_lock( ).

The benefit of the present invention is that when the simple locks aren't contended (which they shouldn't normally be), the extra overhead of the krlock is avoided. When simple locks are contended, they now act fairly and work in the face of differing latencies between all the processors involved. Thus, the present invention provides a significant functional benefit as well as a 'compatibility' with existing source and binary code that uses the simple_lock( ) interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
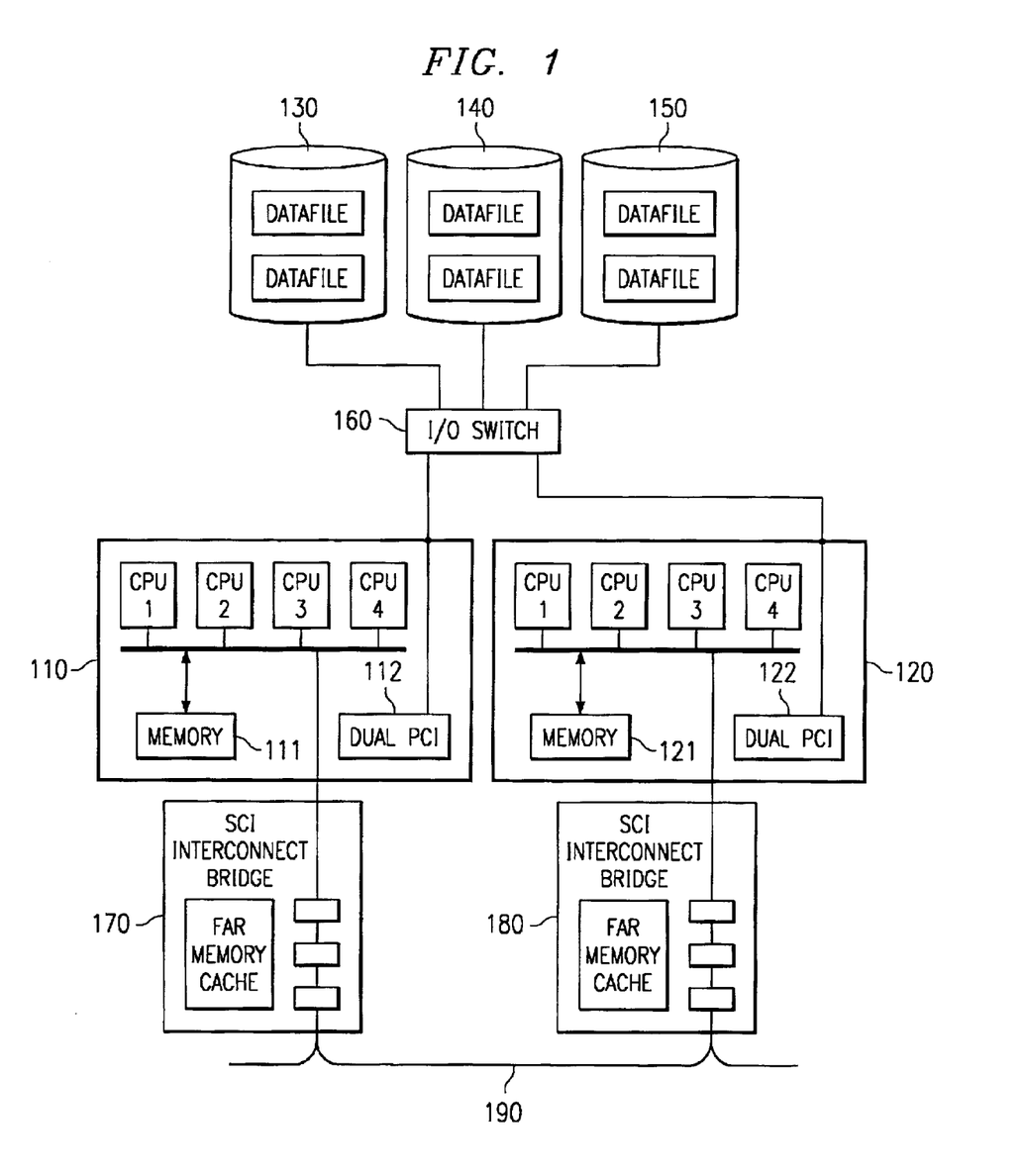
FIG. 1 is an exemplary diagram illustrating a multiprocessor system in accordance with the present invention.

With reference now to the figures, FIG. 1 is an exemplary block diagram of a multiprocessor system in accordance with the present invention. The particular example multiprocessor system 100 shown in FIG. 1 is a non-uniform memory access (NUMA) multiprocessor system, however, other types of multiprocessor systems may be used without departing from the spirit and scope of the present invention. The multiprocessor system 100 is only intended to be exemplary of the multiprocessor systems in which the present invention may be incorporated and is not intended to place any architectural limitations on the present invention.

As shown in FIG. 1, the NUMA multiprocessor system 100 includes a plurality of nodes 110 and 120 shared system resources 130–150, and an input/output (I/O) switch 160. The I/O switch 160 is a mechanism for providing pathways to the shared system resources 130–150 for the various nodes 110 and 130 of the multiprocessor system 100.

Each node 110 and 120 includes a plurality of processors CPU1–CPU4, a local memory 111, 121 and an interface 112, 122 to the I/O switch 160. The processors CPU1–CPU4 are coupled to the local memory 111, 121 and the interface 112, 122 by way of a control/signal bus 113, 123. The nodes 110 and 120 are coupled to one another via the Scalable Coherent Interface (SCI) interconnect bridges 170, 180 and SCI bus 190, through which each node is provided access to memory of each of the other nodes.

As mentioned above, the present invention is directed to providing a mechanism for locking shared resources, such as shared system resources 130–150 or local memories 111, 121, in a manner as to reduce the negative effects of lock contention, such as avoidable cache and bus traffic between processors in the multiprocessor system. In order to provide this mechanism, the simple lock framework, particularly the function associated with acquiring a simple lock, makes use of newly added krlock function such that simple_lock acquisition behaves as a compare_and_swap mutex when there are no collisions on the mutex, and it behaves as a granted lock when contention exists. That is, the behaviors of both lock types are integrated into a single locking interface.

The present invention may be embodied as part of the operating system of the multiprocessor system which will be running on one or more of the processors of one or more of the nodes in the multiprocessor system. For example, the present invention may be embodied in an AIX function that may be called by a processor of the multiprocessor system in order to attempt to obtain a lock on a shared system resource. The present invention, however, is not limited to the particular operating system used or the manner by which the present invention is invoked. Those of ordinary skill in the art will appreciate the ability of the present invention to be utilized in a number of different operating environments, such as any commercial multiprocessor operating system like SUNOS or Windows NT, for example.

With the present invention, when a thread on a processor needs to obtain a disabled lock on a shared system resource, e.g., a thread on CPU1 of node 110 needs to lock a memory location of local memory 121, the processor calls the function of the present invention. With the function of the present invention, if no other processor already holds the lock on the shared system resource, the known simple_lock function operates in a known manner. However, if another processor already has the lock on the shared system resource, a lock miss occurs.

With prior art systems, a lock miss results in the processor, i.e. CPU1, spinning on the lock until the lock is released. When the lock is released, the processor may still not be able to obtain the lock, due to competition for the lock by other processors. As a result, the processor will continue to spin on the lock and will not do any other work until it is able to obtain the lock on the shared system resource.

In the present invention, when a lock miss occurs, the attempt to acquire the lock, i.e. the simple lock, is repeated a predetermined number of times. The number of times, i.e. the threshold, may be set depending on the particular embodiment. Thus, a limited amount of spinning on the lock is possible with the present invention if no krlock is already associated with the simple lock.

Once the threshold is met or exceeded, the simple_lock( ) framework associates a krlock with the simple lock. This association is a transition that more than one processor may be attempting. The simple_lock( ) function manages this association such that exactly one krlock is associated with the simple_lock. The simple_lock( ) function then acquires the associated krlock before resuming the 'spin' to acquire the simple_lock. While acquiring the associated krlock, the given disabled thread or interrupt handler either self-grants the krlock because no other processor owns it, or spins on a reserved location that is independent of the simple lock, until the owner grants ownership.

In the present invention, krlocks are allocated within the simple_lock mechanism whenever a krlock is required as described above. krlocks are allocated from one of several static pools. The base address of each of these static pools is maintained in a non-shared data area such that any processor can quickly determine which pool contains the krlock. That is, each pool is of a fixed size and contains a computable number of krlocks. An abstraction of this arrangement is the index of the krlock. A krlock's index is made up of 16 bits. The low order 7 bits of the index identifies the krlock's location (index) within one of the pools, and the high order 9 bits is an index to the pool itself. Using these abstractions, the simple_lock mechanism can allocate a krlock, and from the address of the krlock compute its index.

In view of the above, the transition from a simple lock having no associated krlock to having an associated krlock will now be described.

The index of the krlock is atomically 'installed' into the simple_lock mutex without changing any other bits in the lock word using compare_and_swap( ). The compare_and_swap( ) function is a function that compares the value of the data at a supplied address to an expected value. If the comparison is good, then the compare_and_swap( ) function attempts to modify the location using architecture specific operations. When the simple_lock code successfully stores this index into the lock word, the transition is complete. The krlock is now associated with the simple lock.

Note that in the case where two different processors are both trying to associate a different krlock with the same simple lock at the same time, one will succeed and one will fail. When an attempt is made to install a krlock index and that attempt fails, the simple_lock mechanism notices that an association has already been made, and the krlock that was allocated by the failing processor is freed and not used for this instance of this simple lock.

The krlocks maintain the state of requesting nodes and requesting processors as well as the owning processor. The data structures also contain reserved storage for each processor on each node to spin on. Under the framework of simple_lock( ), when a processor attempts to acquire the associated krlock, the krlock is either immediately available or it is not.

If it is not, the state information in the krlock data structure is maintained such that the requesting processor can be noted by the owner, and a requesting processor then 'spins' on the reserved location until the owner hands off the krlock. At that time, the owner notes the next requester in line on the same node, and updates the memory location and changes the state of the krlock data to indicate the new owner. If the krlock is immediately available, the krlock owner state is carefully updated. In this way, the processor will spin on a per-processor memory location identified by the krlock rather than on the globally shared mutex protecting the shared system resource.

A simple lock in accordance with the present invention has the following format:

$$idx, ns, rsv, st, tid$$

where idx is the krlock index, ns is the number of spinning processors on a krlock, rsv is the reserved bits, st is the state bits for enabled simple locks, and tid is the thread id of the lock owner. The simple lock mechanism has a different algorithm for 'enabled' simple locks than it does for 'disabled' simple locks. An 'enabled' lock is a lock which is acquired in a pageable execution environment, or an environment where interrupts are fully enabled. A 'disabled' lock is a lock which is acquired while interrupts are at least partially disabled, such that the thread or interrupt handler cannot possibly move to another processor during lock acquisition.

When a lock miss occurs on an enabled simple lock, no krlock is ever associated. Instead, the thread is put to sleep, and the future owner of the simple lock is controlled by the sleep/wake-up mechanism. This invention does not change that behavior. Rather, the present invention is directed to changing the behavior of the simple_lock( ) when used with disabled locks.

As such, the rsv bits are simply not used in the present implementation, and are always zero. The st bits only apply to enabled simple locks, and thus, will not be discussed in detail. The krlock index (idx) uniquely identifies the krlock associated with the simple lock. If this field is null, then a krlock does not yet exist for this simple lock.

A pool of krlocks is initialized during system boot and each processor has an available number of these krlocks that can be allocated upon a lock miss. Each processor has some number of these krlocks "cached" for future use. When a lock miss occurs and there is no krlock for the simple lock, a krlock from this pool, for the particular processor, is allocated to the simple lock. The krlock index field in the simple lock is populated with the index for the allocated krlock, accordingly. The krlock index can be converted to the address of the krlock.

The krlock itself contains a word for the state of the krlock on the node (if a processor on the node is requesting the krlock), a per-node word which contains the state of the krlock on each node (tells which processors on each node are requesting the krlock and which processor on this node (if any) owns the lock), and per-processor spin fields that are updated on krlock hand-off by the krlock owner as a means of handing off the lock. Thus, the krlock, according to the present invention, has the format:

Node state word, per-node word, per-processor fields

These data structures are organized such that the following statements are true:

1. krlock allocation returns a pointer to the node state word.
2. For each node in the system (indexed as node 0, node 1, and so on), the per-node word is located at: node_state_word_address+krlock_stride*node_index The krlock stride is implementation dependent. In AIX, the stride is 4 pages (4*4096). The memory for the per-node data resides on the nodes that it describes.
3. For each processor on a given node indexed as processor 0, processor 1, and so on, the per-processor spin field is located at:

$$(per\_node\_word\_address\ \&\ \sim(krlock\_stride))+(cpu\_index*sizeof(per\text{-}cpu\text{-}field).$$

Given an index to a krlock, all of these locations can be quickly computed.

Under the framework of acquiring a simple lock, when a processor is subsequently directed to acquire a krlock before spinning on the simple lock, the per-node state of the lock is updated to reflect that the processor is requesting the krlock. In addition, the number of spinning processors on the krlock in the ns field of the simple lock is incremented by 1.

When the simple lock is released by the current holder of the simple lock, the processor holding the krlock associated with the simple lock will then obtain the simple lock. The processor holding the krlock then hands-off the krlock to the next processor requesting the krlock. Thus, when the simple lock is released, the processor holding the krlock acquires the simple lock by placing the thread id for the thread on the processor in the tid field of the simple lock using, for example, the compare_and_swap( ) function. The krlock that was held by the processor is handed off to the next processor waiting on the krlock by first updating the per-processor field of the requester to indicate that it has been given the lock, and then by updating the node state word and per-node word to reflect which node holds the krlock and which processor on that node holds the krlock and what processors on the node are still trying to acquire the krlock. In addition, the number of spinning processors on the krlock, ns, is updated by decrementing the number by 1.

Figure 2:
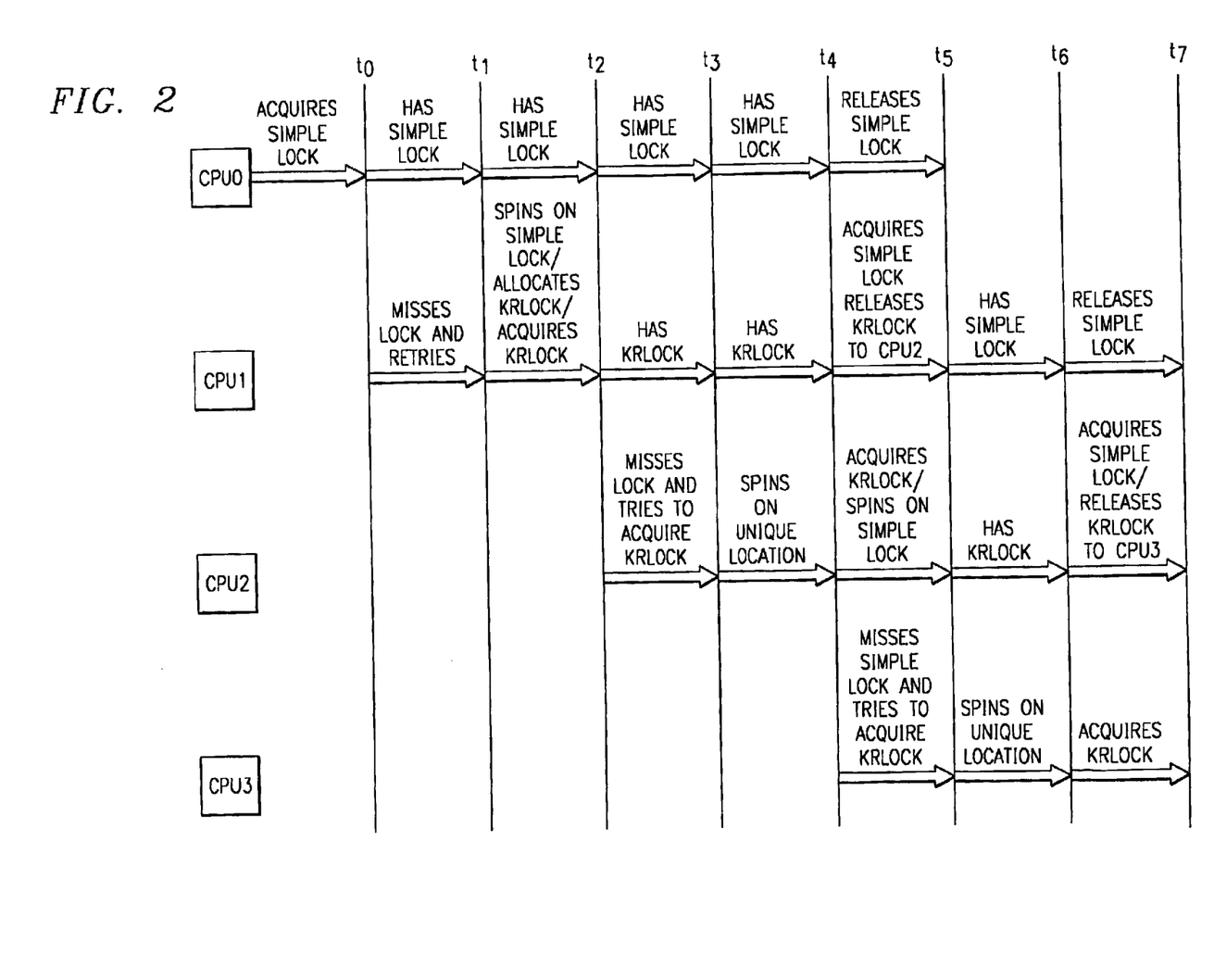
FIG. 2 is an exemplary diagram illustrating an exemplary operation of the present invention.

FIG. 2 is an exemplary diagram illustrating an example operation of the present invention. The example shown in FIG. 2, represents a four processor system in which each of the processors is either holding a simple lock or is trying to acquire the same simple lock. In the example of FIG. 2, CPU0–CPU3 may be located on the same or different nodes of the four processor system.

As shown in FIG. 2, CPU0 acquires the simple lock for a system resource at time to. CPU1 attempts to acquire the simple lock but misses and retries the attempt a predetermined number of times. Then, at time $t_1$, CPU1 determines it has exceeded the spin threshold, allocates a krlock for the simple lock, installs the index of the krlock into the simple lock mutex in the format previously described, and attempts to acquire the krlock. CPU1 may immediately acquire the krlock because no other processor is attempting to acquire it.

At a time $t_2$, CPU2 attempts to obtain the simple lock on a system resource and misses. The simple_lock( ) method directs CPU2 to acquire the krlock. Since the krlock is still held by CPU1, CPU2 is unable to acquire the krlock. As a result, at time $t_3$, CPU2 spins on a unique location designated by the krlock, i.e. CPU2 spins on the krlock.

At time $t_4$, CPU0 releases the simple lock. As a result, CPU1 acquires the simple lock (since it was the only processor spinning on the simple lock), and releases the krlock to CPU2 by handing off the krlock to CPU2. CPU2 acquires the krlock and spins on the simple lock. Meanwhile, CPU3 attempts to acquire the simple lock, misses the lock and tries to acquire the krlock.

At time $t_5$, CPU1 holds the simple lock, CPU2 holds the krlock, and CPU3 is spinning on a unique location identified by the krlock. At time $t_6$, CPU1 releases the simple lock and CPU2 acquires the simple lock (since it was the only processor spinning on the simple lock) and releases the krlock to CPU3. CPU3 acquires the krlock and the process continues in the same fashion.

Thus, with the present invention, once a krlock is associated with a simple lock, there is only one processor spinning on the simple lock at any one time. In addition, each processor that is in line to acquire the simple lock, spins on a per-processor memory location thereby eliminating the bus traffic that would result if those same processors were all attempting to change the same memory location at the same time as is the case in known simple mutex locks. Since the processor is spinning on its own location and no other processor is spinning on it, the data stays in the cache of the spinning processor without causing bus traffic.

Figure 3:
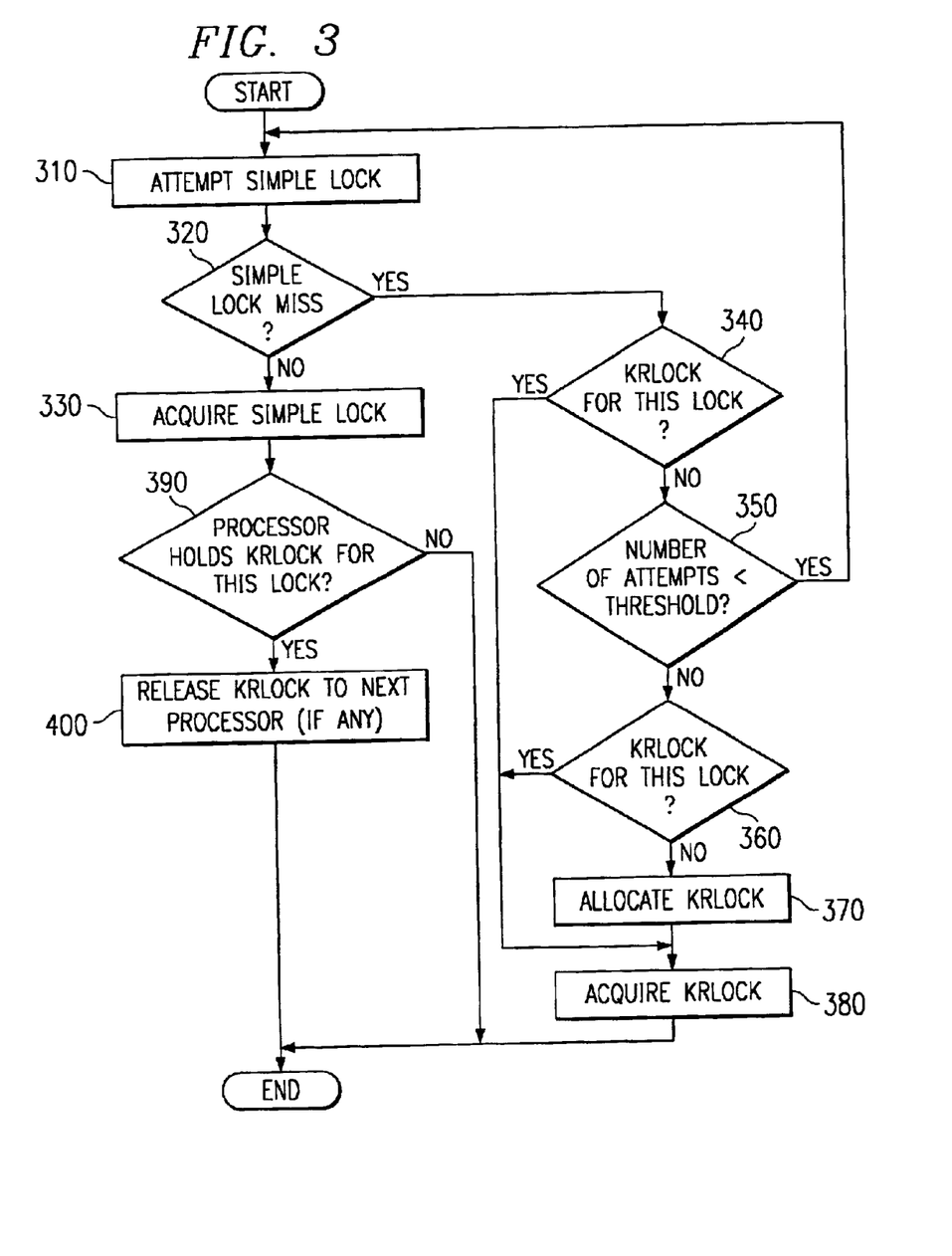
FIG. 3 is a flowchart outlining an exemplary operation of the present invention.

FIG. 3 is a flowchart outlining an exemplary operation of the present invention. As shown in FIG. 3, the operation starts with an attempt to acquire a simple lock on a system resource (step 310). A determination is made as to whether the simple lock is already owned (step 320). If the simple lock is not owned, it is acquired immediately (step 330). If it is not acquired immediately, then a 'miss' has occurred. If so, a determination is made as to whether a krlock is associated with the simple lock (step 340). If not, a determination is made as to whether a number of attempts to acquire the lock have met or exceeded a threshold (step 350). If not, the operation returns to step 310 and repeatedly attempts to acquire the simple_lock in a loop. If any of these attempts succeeds, the lock is acquired and the function returns to the caller (step 330).

If the number of attempts to acquire the lock meet or exceed the threshold, a determination is made as to whether a krlock exists for the simple lock (step 360). If not, a krlock is allocated (step 370). Thereafter, or if a krlock already exists for the simple lock in step 340, the krlock is acquired (step 380). The operation then terminates.

If the simple lock is acquired in step 330, a determination is then made as to whether this processor holds the krlock associated with the simple lock (step 390). If so, the krlock is released to a requester if one exists, or if no requester exists, the krlock is disassociated with the simple lock, the krlock is freed (step 400) and the operation terminates.

The operation shown in FIG. 3 may be repeated for each attempt to acquire the simple lock of a system resource. The operation is further described in the following pseudo code for implementing the integrated simple_lock/krlock in accordance with the present invention:

```
        if (simple lock_miss)
{
        if (the lock has a krlock associated with it)
            acquire the krlock
                (note that we don't return from here until
                some other running thread hands the
                krlock to us)
        /* note that the processor either holds the krlock at this
        point or there is no associated krlock yet
                if the processor holds the associated krlock, no other
        processor will be spinning (loading from and trying to
        store) the simple lock word, but each will be spinning on a
        per-cpu word instead, reducing cache 'bouncing'
        significantly. */
        get_lock:
            while (the processor holds krlock or the processor has
        attempted to acquire simple lock less than a predetermined
        number of times)
            {
                attempt to acquire simple lock (compare and swap of the
        lock word)
                if (the processor acquires the simple lock)
                {
                    if (a krlock exists for this simple lock)
                        /* note the processor holds it if it exists
*/
                        if someone else wants the krlock
                            hand it off to the next requester
                        else
                        {
                            no one is spinning, so release the
                            krlock and remove its index from the
                            simple lock word
                            /* the next time a processor misses this
```

-continued

```
lock there will be no associated krlock, and a different
krlock will be associated with this simple lock, if
necessary*/
            }
        return to caller holding simple lock (note the
krlock is either handed off or is released. . .this can be
determined by looking at the simple lock word (it has an
index or it doesn't).
        }
    }
    /* the processor still does not have the simple lock */
    /* Note the processor has 'spun' on a simple lock for
which there was no krlock */
    do
    {
        /* there will not be a krlock the first time */
        if a krlock exists for this lock
        }
            remember it's index
            increment the number of spinners
                break;
        }
        allocate a krlock
        if (initializing the idx and number of spinners==1 to
the lockword is successful)
                break;
        else
                there was a race condition and we have to try again
so, free the allocated krlock
                /* presumably, another processor was able to allocate
and install a krlock for this lock on another processor - we
don't need this one */
                continue looping
    } (until we have an index in the krlock
        /* the lock now has a krlock associated with it, and we
have it's index */
        convert the index to the address of the krlock.
        acquire the krlock associated with this simple_lock
            (we spin in a routine on a krlock lock word until we
are granted the lock).
            go to get_lock;
}
```

The advantage to implementing the mechanism of the present invention is that existing code gets the advantages (fairness) of krlocks without having to change any of the existing code. The existing simple_lock/simple_unlock interfaces handle the details of krlocks without any code changes on the part of the users of simple_lock. For locks that don't contend, the very high performance of simple locks is maintained. For locks that DO contend, they are treated fairly. Since contending locks don't perform well anyway, the extra overhead of krlocks is not really noticed.

In addition, cache bouncing is avoided by use of the present invention. The classic algorithm for mutex lock acquisition is:

```
LOOP:
    LOAD DATA AT LOCK LOCATION
    SUCCESS=COMPARE_AND_SWAP (EXPECTED_VALUE, & data, NEW_VALUE
)
    IF SUCCESS, GOTO DONE
    GOTO LOOP;
DONE:
```

With the compare_and_swap( ) function, of the classic algorithm, many loads and stores to the lock word location are required and the hardware must perform cache transfers between the processors to keep each processor's view of the data consistent (this is known as cache coherence). These cache transfers are referred to as cache bouncing and are much more expensive, i.e. slower, than simply reading data that is always in the processor's cache.

With the present invention, the per-processor krlock data stays in the processor's cache without being transferred to other processors. Thus, cache bouncing is reduced.

While the present invention has been described with reference to a preferred embodiment in which simple locks and krlocks are utilized, the present invention is not limited to these specific mechanisms. Rather, any type of lock and hand-off lock mechanism may be used without departing from the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of locking a system resource in a multiprocessor system, comprising:

attempting to obtain a lock on the system resource;

associating a hand-off lock with the lock on the system resource if the attempt to obtain the lock is unsuccessful, wherein the hand-off lock includes a plurality of pre-processor spin fields, each pre-processor spin field being associated with one processor in the multiprocessor system and identifying a memory location dedicated to that one processor, and wherein only the one processor may spin on the memory location identified by the processor's corresponding dedicated per-processor spin field at any one time; and obtaining the hand-off lock on the system resource if the attempt to obtain the lock on the system resource is unsuccessful, wherein obtaining the hand-off lock includes spinning on the memory location identified by the per-processor spin field for an associated processor.

2. The method of claim 1, wherein the lock is a simple lock.

3. The method of claim 1, wherein the hand-off lock is a krlock.

4. The method of claim 1, wherein the step of attempting to obtain a lock on the system resource is performed a predetermined number of times before associating a hand-off lock with the lock on the system resource.

5. The method of claim 1, wherein the hand-off lock is obtained from a pool of hand-off locks.

6. The method of claim 1, wherein associating a hand-off lock with the lock on the system resource includes storing an index of the hand-off lock in a lock word of the lock on the system resource.

7. The method of claim 1, wherein if the lock on the system resource is freed, the method further comprises:
   obtaining the lock on the system resource;
   releasing the hand-off lock; and
   handing-off the hand-off lock to a next processor spinning on the hand-off lock.

8. The method of claim 1, wherein the method is implemented in a multiprocessor system having one or more nodes, and wherein the hand-off lock includes a per-node word which contains a state of the hand-off lock on each node of the multiprocessor system.

9. The method of claim 8, wherein when the lock on the system resource is released, the per-node word and per-processor spin fields of the hand-off lock are updated to reflect a next processor obtaining the lock on the system resource.

10. The method of claim 1, wherein the method is implemented in one of a SMP, a NUMA, and a ccNUMA system.

11. A computer program product in a computer readable medium for locking a system resource in a multiprocessor system, comprising:
   first instructions for attempting to obtain a lock on the system resource;
   second instructions for associating a hand-off lock with the lock on the system resource if the attempt to obtain the lock is unsuccessful, wherein the hand-off lock includes a plurality of per-processor spin fields, each per-processor spin field being associated with one processor in the multiprocessor system and identifying a memory location dedicated to that one processor, and wherein only the one processor may spin on the memory location identified by the processor's corresponding dedicated per-processor spin field at any one time; and
   third instructions for obtaining the hand-off lock on the system resource if the attempt to obtain the lock on the system resource is unsuccessful, wherein obtaining the hand-off lock includes spinning on the memory location identified by the per-processor spin field for an associated processor.

12. The computer program product of claim 11, wherein the lock is a simple lock.

13. The computer program product of claim 11, wherein the hand-off lock is a krlock.

14. The computer program product of claim 11, further comprising instructions for executing the first instructions a predetermined number of times before executing the second instructions.

15. The computer program product of claim 11, wherein the hand-off lock is obtained from a pool of hand-off locks.

16. The computer program product of claim 11, wherein the second instructions include instructions for storing an index of the hand-off lock in a lock word of the lock on the system resource.

17. The computer program product of claim 11, wherein the computer program product further comprises:
   fourth instructions for obtaining the lock on the system resource, if the lock on the system resource is freed;
   fifth instructions for releasing the hand-off lock; and
   sixth instructions for handing-off the hand-off lock to a next processor spinning on the hand-off lock.

18. The computer program product claim 11, wherein the hand-off lock includes a per-node word which contains a state of the hand-off lock on each node of a multiprocessor system.

19. The computer program product of claim 18, further comprising fourth instructions for updating the per-node word and per-processor spin fields of the hand-off lock to reflect a next processor obtaining the lock on the system resource, when the lock on the system resource is released.

20. The computer program product of claim 11, wherein the first, second and third instructions are formatted for use with one of an SMP, a NUMA, and a ccNUMA system.

21. An apparatus for locking a system resource in a multiprocessor system, comprising:
   means for attempting to obtain a lock on the system resource;
   means for associating a hand-off lock with the lock on the system resource if the attempt to obtain the lock is unsuccessful, wherein the hand-off lock includes a plurality of per-processor spin fields, each per-processor spin field being associated with one processor in the multiprocessor system and identifying a memory location dedicated to that one processor, and wherein only the one processor may spin on the memory location identified by the processor's corresponding dedicated per-processor spin field at any one time; and
   means for obtaining the hand-off lock on the system resource if the attempt to obtain the lock on the system resource is unsuccessful, wherein obtaining the hand-off lock includes spinning on the memory location identified by the per-processor spin field for an associated processor.

22. The apparatus of claim 21, wherein the lock is a simple lock.

23. The apparatus of claim 21, wherein the hand-off lock is a krlock.

24. The apparatus of claim 21, wherein the means for attempting to obtain the lock on the system resource operates a predetermined number of times before the means for associating the hand-off lock operates.

25. The apparatus of claim 21, wherein the hand-off lock is obtained from a pool of hand-off locks.

26. The apparatus of claim 21, wherein the means for associating the hand-off lock includes means for storing an index of the hand-off lock in a lock word of the lock on the system resource.

27. The apparatus of claim 21, wherein the apparatus further comprises:
   means for obtaining the lock on the system resource, if the lock on the system resource is freed;
   means for releasing the hand-off lock; and
   means for handing-off the hand-off lock to a next processor spinning on the hand-off lock.

28. The apparatus claim 21, wherein the apparatus is part of a multiprocessor system having one or more nodes, and wherein the hand-off lock includes a per-node word which contains a state of the hand-off lock on each node of the multiprocessor system.

29. The apparatus of claim 28, further comprising means for updating the per-node word and per-processor spin fields of the hand-off lock to reflect a next processor obtaining the lock on the system resource, when the lock on the system resource is released.

30. The apparatus of claim 21, wherein the apparatus is part of one of a SMP, a NUMA, and a ccNUMA system.

31. The method of claim 1, wherein the only processor in the multiprocessor system that may obtain the lock is a processor that currently owns the hand-off lock.

32. The method of claim 1, wherein a state structure associated with the hand-off lock identifies an order in which processors spinning on memory locations identified by the per-processor spin fields of the hand-off lock are to be given ownership of the hand-off lock.

33. The method of claim 32, wherein when a processor that owns the hand-off lock acquires the lock, the processor that owns the hand-off lock hands ownership of the hand-off lock to a next processor attempting to acquire the hand-off lock as determined by the state structure.

34. The method of claim 32, wherein the state structure identifies which processor of the multiprocessor system owns the hand-off lock and which processors of the multiprocessor system are trying to obtain the hand-off lock, if any.

35. The method of claim 1, wherein data in the memory locations identified by the per-processor spin fields is maintained in corresponding caches of the associated processors while the processors spin on their corresponding memory locations.

36. The method of claim 1, wherein the hand-off lock serializes handing off of ownership of the hand-off lock to processors in the multiprocessor system based on the per-processor spin fields.

37. The computer program product of claim 11, wherein the only processor in the multiprocessor system that may obtain the lock is a processor that currently owns the hand-off lock.

38. The computer program product of claim 11, wherein the hand-off lock serializes handing off of ownership of the hand-off lock to processors in the multiprocessor system based on the per-processor spin fields.

39. The computer program product of claim 11, wherein a state structure associated with the hand-off lock identifies an order in which processors spinning on memory locations identified by the per-processor spin fields of the hand-off lock are to be given ownership of the hand-off lock.

40. The computer program product of claim 39, wherein when a processor that owns the hand-off lock acquires the lock, the processor that owns the hand-off lock hands ownership of the hand-off lock to a next processor attempting to acquire the hand-off lock as determined by the state structure.

41. The computer program product of claim 39, wherein the state structure identifies which processor of the multiprocessor system owns the hand-off lock and which processors of the multiprocessor system are trying to obtain the hand-off lock, if any.

42. The apparatus of claim 21, wherein data in the memory locations identified by the per-processor spin fields is maintained in corresponding caches of the associated processors while the processors spin on their corresponding memory locations.

43. The apparatus of claim 21, wherein the only processor in the multiprocessor system that may obtain the lock is a processor that currently owns the hand-off lock.

44. The apparatus of claim 21, wherein the hand-off lock serializes handing off of ownership of the hand-off lock to processors in the multiprocessor system based on the per-processor spin fields.

45. The apparatus of claim 21, wherein a state structure associated with the hand-off lock identifies an order in which processors spinning on memory locations identified by the per-processor spin fields of the hand-off lock are to be given ownership of the hand-off lock.

46. The apparatus of claim 45, wherein when a processor that owns the hand-off lock acquires the lock, the processor that owns the hand-off lock hands ownership of the hand-off lock to a next processor attempting to acquire the hand-off lock as determined by the state structure.

47. The apparatus of claim 45, wherein the state structure identifies which processor of the multiprocessor system owns the hand-off lock and which processors of the multiprocessor system are trying to obtain the hand-off lock, if any.

48. The apparatus of claim 21, wherein data in the memory locations identified by the per-processor spin fields is maintained in corresponding caches of the associated processors while the processors spin on their corresponding memory locations.

* * * * *